May 4, 1943.   P. B. DRAKE   2,318,383
SWITCH WIPER SPRING AND METHOD OF REPLACEMENT THEREOF
Filed June 28, 1941
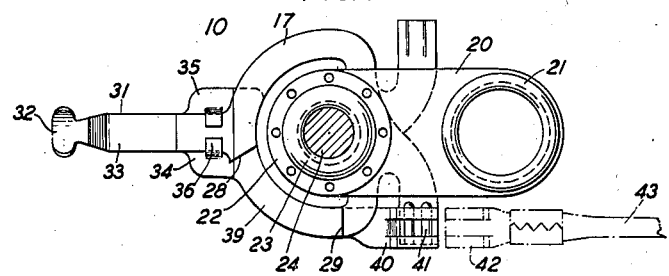
FIG. 1
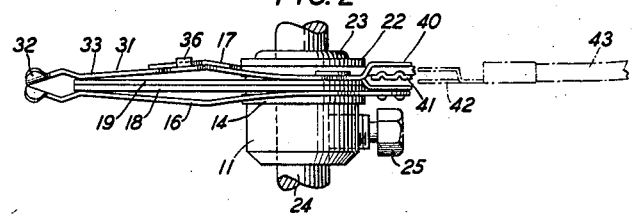
FIG. 2
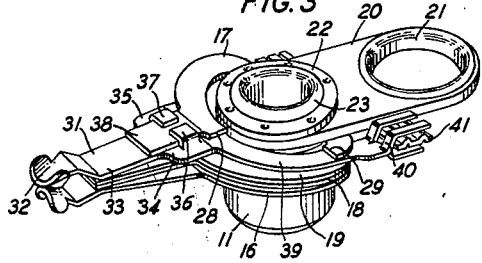
FIG. 3
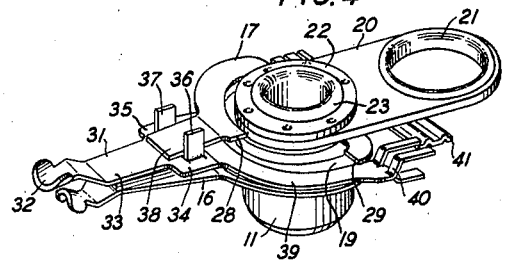
FIG. 4
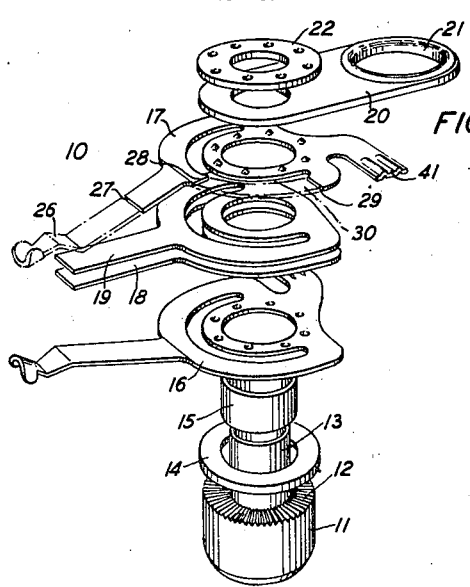
FIG. 5
FIG. 6
INVENTOR
P. B. DRAKE
BY
*[signature]*
ATTORNEY Patented May 4, 1943

2,318,383

UNITED STATES PATENT OFFICE 2,318,383

SWITCH WIPER SPRING AND METHOD OF REPLACEMENT THEREOF

Percy E. Drake, Morristown, N. J., assignor to Bell Telephone Laboratories, Incorporated, New York, N. Y., a corporation of New York Application June 28, 1941, Serial No. 400,340

9 Claims. (Cl. 179—27.51)

This invention relates to switching mechanisms used in automatic and semiautomatic telephone systems and particularly to replacing springs for wipers of said switching mechanisms. It is applicable to a switching mechanism of the type in which a set of movable wiper brushes are adapted to engage a set of superposed fixed terminals in succession to find a marked line thereon.

An object of this invention is to provide a more economical replacing spring for a worn-out wiper spring in a switching mechanism.

Another object is to simplify maintenance procedure in the replacement of worn-out wiper springs.

In the construction of selector and connector switches, for example, switch wiper springs are insulatedly mounted on a switch hub while the hub in turn is secured to a switch shaft. The shaft when actuated by a switch (not shown) causes the wiper springs, as is well known in the art, to engage selectively and with uniform contacting pressure bank terminals (not shown) disposed in a number of superposed rows. After a switch has operated many times, the contacting surfaces of the wiper springs become worn because of friction developed during engagement of the springs by the bank terminals. The wear is also accentuated by disalignment of the springs with the band terminal rows, which may be due to accidental injury or to wear in the operating part of the switch. A worn spring no longer operates satisfactorily and therefore requires replacement.

In order to replace a worn wiper spring, it has been customary heretofore to remove the entire switch wiper assembly from the switch shaft and to replace it by a new wiper assembly. This method of replacement requires a substantial amount of maintenance labor, as the replacing assembly must be aligned with the various rows of bank terminals, and therefore represents a loss in useful time of the switch. Furthermore, additional labor is involved in disconnecting and reconnecting the wiper cord wires not only to the worn wiper spring assembly but in many instances also to the wiper assemblies mounted directly above. Since the wiper spring assembly usually comprises a pair of springs, a single worn-out spring requires the replacement of both springs, although one of the springs is still in a serviceable condition.

In accordance with an embodiment of this invention, applicant provides a replacing wiper spring that eliminates the necessity for removal of the entire wiper spring assembly from the shaft. The replacement of the spring is accomplished by the expedient of cutting away particular sections of the worn spring and securing to the remainder thereof, a replacing spring of somewhat similar design. The replacing spring is so designed that when attached to the spring assembly it has the equivalent spring tension of the replaced spring, it has the proper alignment, and is conformable with the companion spring in its operating procedure. Either one or both wiper springs of a switch may be so replaced.

A more complete understanding of this invention will be obtained from the detailed description which follows and by reference to the appended drawing wherein:

Fig. 1 shows a plan view of the wiper spring assembly with the replacing spring mounted thereon;

Fig. 2 shows an elevation view of the wiper spring assembly seen in Fig. 1;

Fig. 3 shows a perspective view of the wiper spring assembly seen in Fig. 1;

Fig. 4 shows a perspective view of the wiper spring assembly illustrating a step in the mounting procedure of a replacing wiper spring;

Fig. 5 shows an exploded view of a wiper spring assembly with the dotted portion of the upper worn-out wiper spring to be severed therefrom; and Fig. 6 shows a perspective view of an alternative method for securing a replacing spring to a wiper spring assembly.

Referring now to the drawing, particularly to Fig. 5, it will be seen that the wiper assembly 10 comprises a metallic hub 11 having a knurled shoulder 12 and collar 13. A washer 14 and bushing 15 of insulating material disposed on shoulder 12 and around collar 13 insulate wiper springs 16 and 17 from hub 11; insulators 18 and 19 insulate wiper springs 16 and 17 from each other while at the same time provide the required degree of separation between the tips thereof for proper engagement with the bank terminals (not shown). An insulated cord guide 20 having an eyelet 21 insulates the upper wiper spring 17 from metallic washer 22. The above-described details are assembled into a compact arrangement in the order shown and are clamped together by flaring the top portion of collar 13 over washer 22. The completed flare 23 is shown in Fig. 1.

The above-described wiper spring assembly 10 is installed upon a switch shaft 24, properly aligned, and secured thereto by any suitable means such as set screw 25.

The wiper springs after many operations become worn out and it therefore becomes essential to replace one or both of the springs. For example, let it be assumed that the upper wiper spring 17 of the assembly 10 requires replacement. Heretofore, it would have been necessary, as previously described, to replace the assembly 10 by an entirely new assembly. Applicant, however, expeditiously replaces the upper spring 17 by severing, in any suitable manner, such as by a hand clipping tool, the tip portion 26 at the shank 27 and the annular section 30 at points 28 and 29. For purposes of illustration the severed parts have been shown dotted in Fig. 5.

The replacing spring 31 (Fig. 4) comprises a wiping surface 32 and shank 33 substantially identical to that of the replaced spring 17, shoulders 34 and 35, which are slightly broader than those of the original spring in order to provide two projections 36 and 37 that serve to clinch the shank 38 of the original spring 17, and a concentric arcuate portion 39 with a furcated terminal 40 at the end thereof.

An initial step in mounting the replacing spring 31 is shown in Fig. 4. The replacing spring 31 is interposed between the remaining portions of the severed spring 17 and insulator 19 in such manner that the shoulders 34 and 35 are underneath shank 38 and the projections 36 and 37 are abutting the sides of shank 38. The arcuate portion 39 is in partial engagement with spring 17 at points 28 and 29 while furcated terminal 40 is positioned for contact with terminal 41 of the original spring 17.

Another step in mounting the replacing spring 31 is shown in Fig. 3 where it is seated into its ultimate position after which the projections 36 and 37 are clamped over shank 38 to embracingly secure the replacing spring 31 thereto. Terminal 42 of wiper cord 43 (Fig. 2) is then inserted between the prongs of furcated terminal 40 and into embraced engagement with terminal 41. It is to be noted, however, that terminal 42 of cord 43 may remain attached to terminal 41 of the original spring and thus in that event furcated terminal 40 would be inserted into embraced engagement with combined terminals 41 and 42. These terminals are connected together by any suitable means such as by soldering. This terminal connection serves to secure the replacing spring 31 at one point and in cooperation with the shoulder-shank fastening provides a well united and properly tensioned arrangement.

Applicant has discovered that an excessive tension of the spring on the bank terminals greatly increases spring wear and that insufficient tension fails to establish proper circuit connection with consequent interference in the proper transmission of speech. By removing the aforesaid sections of the worn spring and securing to the remainder thereof a spring of the design disclosed herein, applicant has provided a replacing wiper spring arrangement that conforms substantially in tension and operating procedure to its companion wiper spring. In addition, by the use of the replacing spring of this invention, the inconvenience of replacing an entire wiper assembly is effectively avoided and a large amount of time is saved in the operating time of the switch.

In Fig. 6 is shown a modified form of replacing wiper spring, which may be used alternatively to that described above. In this modification the clinching means for securing the replacing spring differs from the previously described arrangement and comprises a single projection 44 extending from the shank of the replacing spring 46 through an aperture 47 in the shank of the worn spring 48, and bent sharply into intimate contact with said worn-out spring 48. Since a single projection is only required in this modified spring, a shoulder is not provided thereon and therefore the shank of the replacing spring conforms in outline to that of the replaced spring.

While the features of this invention have been disclosed with reference to a specific embodiment only, it is, of course, understood that various modifications may be made in the details of construction without departing from the scope of this invention as defined in the appended claims.

What is claimed is:

1. In a switching mechanism, a set of wipers including a wiper spring and a segment of a companion wiper spring mounted in cooperative relation with each other, said segment including a section of a shank of said companion spring, a second wiper spring removably affixed to said segment, said second spring comprising a contact making member, a shank, a plurality of projections on said shank for clinching the sectional shank of said segment, an arcuate member concentric with the wiper spring, and a furcated terminal at the extremity of said arcuate member for connection with said segment of the companion spring.

2. In a switching mechanism, a switch wiper assembly having a hub with a wiper spring and segment of a worn-out companion wiper spring mounted thereon, said segment including a terminal and section of shank integral thereto, a second wiper spring removably affixed to said segment, said second spring comprising a contact making member, a shank, a plurality of projections integral to said shank for clinching the sectional shank of said segment, an arcuate member concentric with the wiper spring, and a terminal at the extremity of said arcuate member for connection to the terminal of the segment.

3. In a switching mechanism, an assembly of wipers including a wiper spring and a segment of a companion wiper spring mounted in cooperative relation with each other, said segment including a section of the shank of said companion spring, said section having an aperture therein, a second wiper spring removably affixed to said segment, said second spring comprising a contact making member, a shank, a projection on said shank inserted through said aperture for clamping the sectional shank of said segment, an arcuate member concentric with the wiper spring, and a furcated terminal at the extremity of said arcuate member for connection to said segment of the companion spring.

4. The method of replacing a worn-out wiper spring in an automatic switching mechanism, which consists in severing portions of said spring, inserting underneath the remainder thereof a replacing wiper spring, and securing said springs together by clamping and soldering means.

5. The method of replacing a worn-out wiper spring in an automatic switching mechanism, which consists in removing the tip of said spring, removing an arcuate section of said spring to increase the flexibility thereof, inserting a replacing wiper spring underneath the remaining structure of said worn-out spring, clinching the shank of the replacing spring to that of the replaced spring, and soldering the terminals of the replaced spring, replacing spring, and cord together.

6. A switch wiper comprising a mounting hub, a contact wiper spring affixed to said hub, a second contact wiper spring, and means for removably supporting said second wiper spring independently of said mounting hub and in spaced superposed relation to said first wiper spring, said means comprising a resilient element affixed to said hub and having integrally spaced projections among which said second wiper spring is adapted to be inserted and to be held in fixed relation to said first wiper spring.

7. In combination, a switch shaft and a wiper unit embracingly affixed to said shaft, said wiper unit comprising a hub, a collar on said hub, a wiper spring including a wiping and a body portion of which the body portion is secured to said hub, said wiper spring have an aperture in the body thereof for encircling said hub collar and shaft, whereby removal of said spring necessitates removal of the hub from the shaft, a segment of a companion wiper spring similarly disposed in cooperative relation with said first-mentioned wiper spring, said segment formed by severing the wiping portion of the companion wiper spring, a replacing wiping portion, and means for removably supporting said replacing wiping portion on said segment.

8. In combination, a switch shaft and a wiper unit embracingly affixed to said shaft, said wiper unit comprising a hub, a collar on said hub, a plurality of segments of wiper springs secured to said hub, said segments formed by severing wiping portions from the springs and having aligned apertures for encircling said hub collar and shaft, whereby removal of any one of said segments necessitates removal of the hub from the shaft, replacing wiping portions, and means for detachably supporting said replacing wiping portions on said segments.

9. In a switching mechanism, a shaft in combination with a set of wipers affixed to said shaft, said set comprising a hub, a collar on said hub, a wiper spring and a segment of a companion wiper spring mounted in cooperative relation with each other upon said hub, the body portions of said wiper spring and segment having aligned apertures for surrounding said hub collar and shaft, said segment formed by cutting off the contact portion and an arcuate section of the companion wiper spring, and a contact element, said element comprising a contact making member, and means for securing said element to the segment.

PERCY B. DRAKE.